(12) United States Patent
Singh et al.

(10) Patent No.: US 9,852,820 B2
(45) Date of Patent: Dec. 26, 2017

(54) NUCLEAR STEAM SUPPLY SYSTEM

(71) Applicant: SMR Inventec, LLC, Marlton, NJ (US)

(72) Inventors: Krishna P. Singh, Hobe Sound, FL (US); Joseph Rajkumar, Marlton, NJ (US)

(73) Assignee: SMR INVENTEC, LLC

(*) Notice: Subject to any disclaimer, the term of this patent is extended or adjusted under 35 U.S.C. 154(b) by 231 days.

(21) Appl. No.: 14/397,135

(22) PCT Filed: Apr. 25, 2013

(86) PCT No.: PCT/US2013/038289
§ 371 (c)(1),
(2) Date: Oct. 24, 2014

(87) PCT Pub. No.: WO2013/163475
PCT Pub. Date: Oct. 31, 2013

(65) Prior Publication Data
US 2015/0110236 A1   Apr. 23, 2015

Related U.S. Application Data

(60) Provisional application No. 61/638,257, filed on Apr. 25, 2012.

(51) Int. Cl.
*G21C 15/24* (2006.01)
*G21C 15/26* (2006.01)
*G21D 1/00* (2006.01)

(52) U.S. Cl.
CPC ........... *G21C 15/24* (2013.01); *G21C 15/26* (2013.01); *G21D 1/006* (2013.01); *Y02E 30/40* (2013.01)

(58) Field of Classification Search
CPC ...... G21C 15/24; G21C 15/243; G21C 15/26; G21D 1/006

(Continued)

(56) References Cited

U.S. PATENT DOCUMENTS 3,322,640 A * 5/1967 Heathcote .............. G21C 1/322
376/406
4,235,672 A * 11/1980 Harand .................. G21C 9/001
376/406

(Continued)

FOREIGN PATENT DOCUMENTS

CN    1076051     9/1993
DE    3620672    12/1987

(Continued)

OTHER PUBLICATIONS

Corresponding Chinese Office Action and Search Report dated Mar. 14, 2016.

(Continued)

*Primary Examiner* — Jack W Keith
*Assistant Examiner* — Daniel Wasil
(74) *Attorney, Agent, or Firm* — The Belles Group, P.C.

(57) ABSTRACT

A nuclear steam supply system utilizing gravity-driven natural circulation for primary coolant flow through a fluidly interconnected reactor vessel and a steam generating vessel. In one embodiment, the steam generating vessel includes a plurality of vertically stacked heat exchangers operable to convert a secondary coolant from a saturated liquid to superheated steam by utilizing heat gained by the primary coolant from a nuclear fuel core in the reactor vessel. The secondary coolant may be working fluid associated with a Rankine power cycle turbine-generator set in some embodiments. The steam generating vessel and reactor vessel may each be comprised of vertically elongated shells, which in one embodiment are arranged in lateral adjacent relationship. In one embodiment, the reactor vessel and steam generating vessel are physically discrete self-supporting structures which may be physically located in the same containment vessel.

14 Claims, 15 Drawing Sheets

(58) Field of Classification Search
USPC .............................................. 376/307, 402
See application file for complete search history.

(56) References Cited

U.S. PATENT DOCUMENTS

| | | | |
|---|---|---|---|
| 4,511,532 A | | 4/1985 | Pierart |
| 4,753,771 A | * | 6/1988 | Conway ................ G21C 15/18 376/283 |
| 5,091,143 A | * | 2/1992 | Tate ..................... G21C 1/084 376/282 |
| 5,661,770 A | | 8/1997 | Spinks |
| 5,828,714 A | | 10/1998 | De Venne |
| 8,559,583 B1 | * | 10/2013 | Sato ..................... G21C 15/18 376/283 |
| 2012/0076254 A1 | * | 3/2012 | Malloy .................. G21C 7/08 376/389 |
| 2012/0307956 A1 | * | 12/2012 | Singh .................... G21C 7/32 376/298 |

FOREIGN PATENT DOCUMENTS

| | | |
|---|---|---|
| EP | 0232186 | 8/1987 |
| JP | S53-100397 A | 9/1978 |
| JP | S58-010675 A | 1/1983 |
| JP | S62-030996 A | 2/1987 |
| JP | H06-109202 A | 4/1994 |
| JP | 2002-333288 A | 11/2002 |
| JP | 2005-274337 A | 10/2005 |
| WO | 2012047438 | 4/2012 |

OTHER PUBLICATIONS

Corresponding Supplementary Search Report for PCT/US2013/038289 dated Feb. 2, 2016.
Corresponding Notice of Grounds for Refection from KIPO dated Sep. 17, 2015.
Holtec Inherently—Safe Modular Underground Reactor, May 20, 2011, http://www.uxc.com/smr/Library/Design%20Specific/SMR-160%20(HI-SMUR)/Other%20Documents/Holtec%20Technical%20Bulletin%20(HI-SMUR).pdf.
Corresponding Japanese Office Action dated Nov. 27, 2015.
BY10508 Cl "Boiling nuclear reactor having natural coolant circulation" dated Apr. 30, 2008, available in Russian language only.

* cited by examiner

NUCLEAR STEAM SUPPLY SYSTEM

CROSS-REFERENCE TO RELATED PATENT APPLICATIONS

The present application is a U.S. national stage application under 3.5 U.S.C. §371 of PCT Application No. PCT/US2013/038289, filed on Apr. 25, 2013, which in turn claims the benefit of U.S. Provisional Patent Application Ser. No. 61/638,257, filed Apr. 25, 2012, the entireties of which are incorporated herein by reference.

FIELD OF THE INVENTION

The present invention relates nuclear steam supply systems, and more particularly to a steam supply system for a small modular reactor having a natural gravity driven coolant flow circulation system.

BACKGROUND OF THE INVENTION

Pressurized water reactors (PWRs) for nuclear power generation facilities utilize both pumped and natural circulation of the primary coolant to both cool the reactor core and heat the secondary coolant to produce steam which may be working fluid for a Rankine power generation cycle. The existing natural circulation PWRs suffer from the drawback that the heat exchange equipment is integrated with and located within the reactor pressure vessel. Such an arrangement not only makes the heat exchange equipment difficult to repair and/or service, but also subjects the equipment to corrosive conditions and results in increased complexity and a potential increase in the number of penetrations into the reactor pressure vessel. In addition, locating the heat exchange equipment within the reactor pressure vessel creates problems with respect to radiation levels encountered for crews to repair the heat exchange equipment in proximity to the radioactively hot components of the reactor vessel. The general view has also been that the heat exchangers should be located in the reactor vessel to achieve natural circulation in those systems which may utilize this type of flow circulation.

An improved nuclear steam supply system is desired.

SUMMARY OF THE INVENTION

The present invention provides an improved nuclear supply system that overcomes the deficiencies of the foregoing existing arrangements.

According to one embodiment of the present invention, a nuclear steam supply system with natural gravity-driven coolant circulation includes a vertically elongated reactor vessel comprising a shell forming an internal cavity, a reactor core comprising nuclear fuel disposed within the internal cavity, a steam generating vessel comprising a shell and a plurality of heat exchanger sections disposed in a vertically stacked relationship, the steam generating vessel shell being formed separately from the reactor vessel shell and fluidly connected together via a fluid coupling, and a closed-loop primary coolant system formed between the reactor vessel and the steam generating vessel, the primary coolant system having a primary coolant flowing through the reactor pressure vessel to cool the reactor core and through the steam generating vessel to transfer heat to a secondary coolant flowing through the steam generating vessel. The primary coolant system is configured to induce gravity driven circulation of the primary coolant through the reactor vessel and steam generating vessel. The secondary coolant flows vertically through each of the heat exchanger sections of the steam generating vessel and changes phase from liquid to steam. Accordingly, in one embodiment, the primary coolant system does not include a pump. Operation of the reactor core heats the primary coolant to a degree sufficient to cause natural circulation of the primary coolant through the closed-loop primary coolant system between the reactor vessel and the steam generating vessel.

According to another embodiment, a nuclear steam supply system with natural gravity-driven coolant circulation includes a vertically elongated reactor vessel having a first vertical axis and comprising a shell forming an internal cavity, a vertical riser and a downcomer disposed in the cavity of the reactor vessel for conducting a flowing fluid, the downcomer being in fluid communication with the vertical riser, a reactor core comprising nuclear fuel disposed within the internal cavity of the reactor vessel, a vertically elongated steam generating vessel having a second vertical axis and a cylindrical shell including a plurality of heat exchanger sections fluidly connected in a vertically stacked relationship, the steam generating vessel shell being formed separately from the reactor vessel shell and fluidly connected together via a fluid coupling, and a reactor primary coolant system having a gravity-driven closed flow loop with a primary coolant flowing through the downcomer and vertical riser of the reactor vessel for heating by the reactor core, the primary coolant further flowing through the heat exchanger sections of the steam generating vessel to transfer heat to a secondary coolant flowing through the steam generating vessel. The secondary coolant flows vertically through the heat exchanger sections of the steam generating vessel and changes phase from liquid to steam. The first vertical axis of the reactor vessel is laterally offset from the second vertical axis of the steam generating vessel.

An exemplary method for storing radioactive waste using a container system is provided. The method includes the steps of: heating a liquid primary coolant in a nuclear reactor core disposed in a reactor vessel; flowing the heated primary coolant upwards through the reactor vessel in an first vertical direction inside a vertical riser that is fluidly connected to the reactor core; discharging the heated primary coolant from a top portion of the reactor vessel through an outlet; receiving the heated primary coolant in a bottom portion of the steam generating vessel through an inlet; flowing the heated primary coolant upwards through the steam generating vessel in the first vertical direction inside a vertical riser pipe; receiving the heated primary coolant at a top of the vessel; vertically reversing the direction of the heated primary coolant flow from upwards in the first vertical direction to downwards in a second vertical direction; flowing the heated primary coolant downwards through the steam generating vessel in the second vertical direction, wherein the primary coolant becomes cooled; and returning the cooled primary coolant to the reactor vessel; and repeating the heating step in the reactor vessel; wherein the flow of the primary coolant through the reactor vessel and steam generating vessel forms a closed circulation flow loop. In one embodiment, the method further includes flowing a secondary coolant upwards through the steam generating vessel parallel to the first and second vertical directions of the primary coolant. In one embodiment, the method further includes the second coolant entering a bottom portion of the steam generating vessel as a saturated liquid and leaving a top portion of the steam generating vessel as a superheated vapor.

Advantages and aspects of the present invention include the following:

Core deep underground: The reactor core resides deep underground in a thick-walled Reactor Vessel (RV) made of an ASME Code material that has decades of proven efficacy in maintaining reactor integrity in large PWR and BWR reactors. All surfaces wetted by the reactor coolant are made of stainless steel or Inconel, which eliminates a major source of corrosion and crud accumulation in the RV.

Gravity-driven circulation of the reactor coolant: The nuclear steam supply system according to the present disclosure does not rely on any active components (viz., a Reactor Coolant pump) for circulating the reactor coolant through the core. Instead, the flow of the reactor coolant through the RV, the steam generator heat exchangers, and other miscellaneous equipment occurs by the pressure head created by density differences in the flowing water between the hot and cold segments of the primary loop. The reliability of gravity as a motive force underpins its inherent safety. The movement of the reactor coolant requires no pumps, valves, or moving machinery of any kind.

Black-start capable (no reliance on off-site power): Off-site power is not essential for starting up or shutting down the nuclear steam supply system. The rejection of reactor residual heat during the shutdown also occurs by gravity-driven circulation. Thus, the need for an emergency shut-down power supply at the site—a major concern for nuclear plants—is eliminated. Indeed, the nuclear steam supply system uses gravity (and only gravity) as the motive force to meet its operational imperatives under both normal and accident conditions.

Assurance of a large inventory of water around and over the reactor core: The present nuclear steam supply system reactor vessel (RV) has no penetrations except at its very top, which means that the core will remain submerged in a large inventory of water even under the hypothetical postulated event under which all normal heat rejection paths are lost.

No large penetrations in the Reactor Vessel (RV): All penetrations in the RV are located in the top region of the RV and are small in size. The absence of large piping in the reactor coolant system precludes the potential of a "large break" Loss of Coolant Accident (LOCA) event.

Easy accessibility to all critical components: In contrast to the so-called "integral" reactor systems, the steam generator and the control rod drive system are located outside the RV at a level that facilitates easy access, making their preventive maintenance and repair a conveniently executed activity. The steam generator consists of a single loop that includes in some embodiments a preheater, steam generator, and a superheater topped off by a pressurizer. The heat exchangers in the loop, namely the preheater, the steam generator, and the superheater have built-in design features to conveniently access and plug tubes such as appropriate placed manholes that provide access to the heat exchanger tube sheets and/or tube bundles. The decision to deploy the heat exchange equipment outside of the harsh environment of the reactor cavity in the nuclear steam supply system has been informed by the poor reliability of PWR steam generators over the past 3 decades and the colossal costs borne by the industry to replace them.

The RV flange features a reverse joint to minimize its projection beyond the perimeter of the RV cylinder. This design innovation makes it possible to connect the Stack directly to the RV nozzle—gorging to forging connection—eliminating any piping run between them. This design features eliminates the risk of a large pipe break LOCA.

Demineralized water as the reactor coolant: The reactor coolant is demineralized water, which promotes critical safety because of its strong negative reactivity gradient with rise in temperature. Elimination of borated water also simplifies the nuclear steam supply system (NSSS) by eliminating the systems and equipment needed to maintain and control boron levels in the primary coolant. Pure water and a corrosion-resistant primary coolant loop help minimize crud buildup in the RV.

Improved steam cycle reliability: The reliability of the steam cycle is improved by dispensing with the high pressure turbine altogether. Rather, the cycle steam is superheated before it is delivered to the low pressure turbine. The loss in the Rankine efficiency is less than 0.5 percent; the rewards in terms of enhanced reliability and simplification of the power cycle are quite substantial.

Pressure Control: The pressurizer contains a conventional heating/quenching element (water/steam for pressure control). A bank of electric heaters are installed in the pressurizer section which serve to increase the pressure by boiling some of the primary coolant and creating a steam bubble that resides at the top of the pressurizer near the head. A spray column is located near the top head of the pressurizer which sprays water into the steam bubble thereby condensing the steam and reducing the steam bubble. The increase/decrease in size of the steam bubble serves to increase/decrease the pressure of the primary coolant inside the reactor coolant system. In one exemplary embodiment, the primary coolant pressure maintained by the pressurizer may be without limitation about 2,250 psi.

In alternative embodiments, a nitrogen type pressurizer system may be used. In this embodiment, the pressurizer serves to control the pressure in the reactor vessel by the application of controlled nitrogen pressure from external high pressure nitrogen tanks fluidly coupled to the pressurizer. Nitrogen pressure controlled reactors have been used in other reactor types and have years of successful operating experience with a quick response profile.

Preventing fuel failures in the reactor: Over 70 percent of all fuel failures in operation are known to occur from fretting (erosion from repetitive impact) damage, which is the result of "pinging" of the fuel rods by the grid straps. The vibration of the grid straps is directly related to the level of turbulence around the fuel. In the present nuclear steam supply system, the Reynolds number is approximately 20 percent of that in a typical operating PWR today. A lower Reynolds number translates into an enfeebled pinging action (erosion rate varies approximately as 4.8 power of velocity of impact!) on the rods and thus a drastically reduced fretting damage rate. Lower burn-up levels selected for present nuclear steam supply system (in the 45 GWD per MTU range) in comparison to around 60 in the presently operating reactors) will also help ameliorate embrittlement of the fuel cladding and thus prevent rod wastage.

Increased Self-shielding: The gravity-driven circulation of the primary fluid in the present nuclear steam supply system (NSSS) accrues another significant dividend in the form of a dramatically reduced radiation dose emanating from the NSSS. This is because the Nitrogen (N-16) isotope, produced by the neutron bombardment of oxygen in the reactor water in the core, generates high gamma energy emitting N-16 isotope which is largely responsible for the radiation emanating from the Containment. N-16, however, has a half-life of only 7.4 seconds which is less than one-fourth of the time needed for the primary water to travel to the top of the steam generators. Therefore, the quantity of N-16 is attenuated by over 7 half-lives, which means it is in effect depopulated down to minuscule values. Scoping calculations suggest that the radiation dose from the top of the steam generator in the NSSS can be 3 or more orders of magnitude less than that in a pumped-water PWR of a similar size. Thus, it is not necessary to build a thick concrete containment for present NSSS for radiation shielding. In lieu of building and in situ reinforced concrete containment, a shop fabricated steel containment capable of withstanding a crashing airplane is deployed which is more suitable, and more economical.

BRIEF DESCRIPTION OF THE DRAWINGS

The features of the exemplary embodiments of the present invention will be described with reference to the following drawings, where like elements are labeled similarly, and in which.

Figure 1:
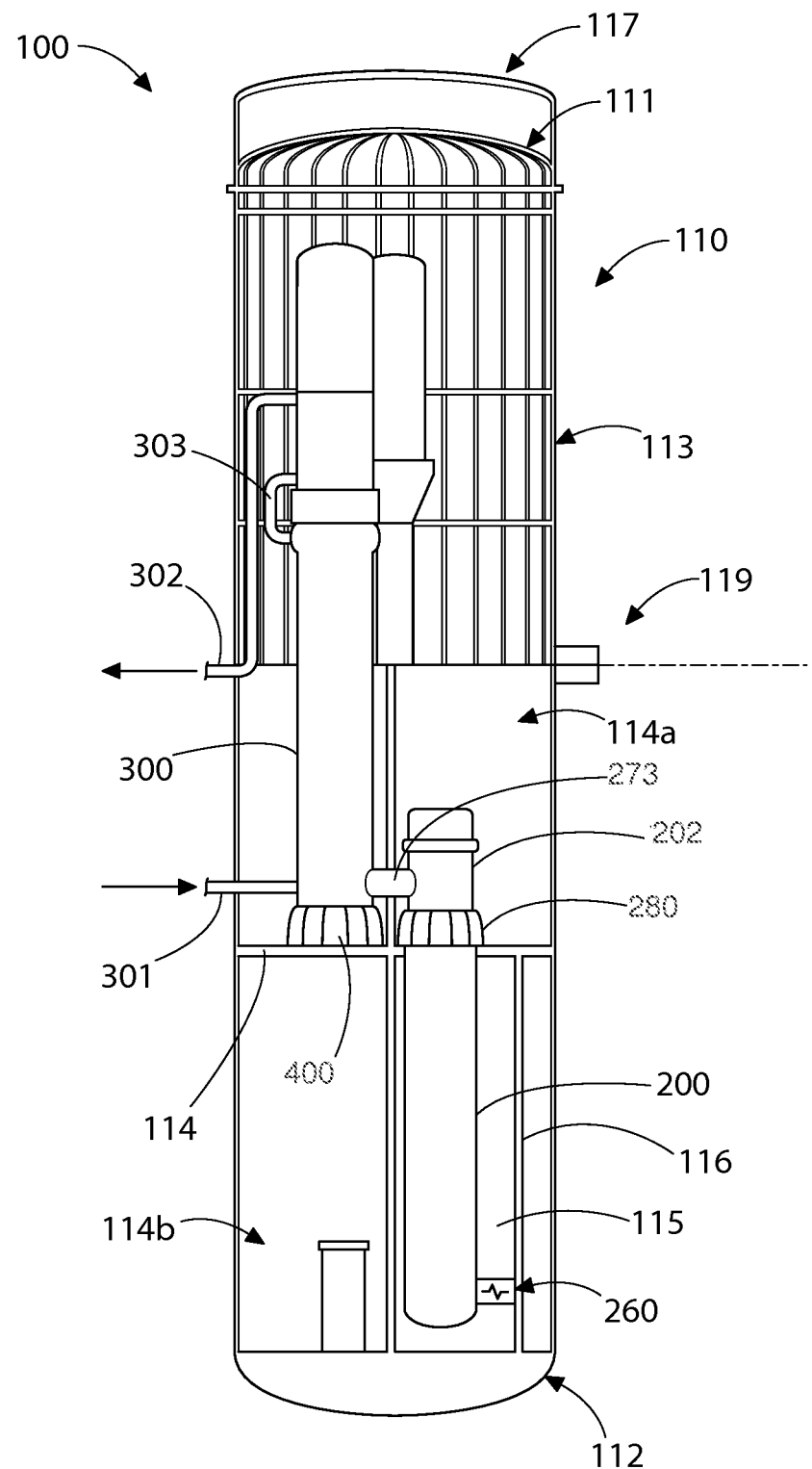
FIG. 1 is cross section of a containment vessel including a nuclear steam supply system according to the present disclosure which includes a steam generator assembly comprising a reactor vessel and a steam generating vessel.

All drawings are schematic and not necessarily to scale.

DETAILED DESCRIPTION OF THE EMBODIMENTS

The features and benefits of the invention are illustrated and described herein by reference to exemplary embodiments. This description of exemplary embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal,", "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Accordingly, the disclosure expressly should not be limited to such exemplary embodiments illustrating some possible non-limiting combination of features that may exist alone or in other combinations of features.

Referring to FIGS. 1-6, a steam supply system for a nuclear pressurized water reactor (PWR) according to the present disclosure is shown. From the thermal-hydraulic standpoint, the system includes a steam generator assembly 100 generally including a reactor vessel 200 and a steam generating vessel 300 fluidly coupled to the reactor vessel. The steam generating vessel and reactor vessel are vertically elongated and separate components which hydraulically are closely coupled, but discrete vessels in themselves that are thermally isolated except for the exchange of primary loop coolant (i.e. reactor coolant) flowing between the vessels. As further described herein, the steam generating vessel 300 in one embodiment includes a preheater 320, main steam generator 330, and a superheater 350 which converts a fluid such as water flowing in a secondary coolant loop from a liquid entering the steam generating vessel 300 at inlet 301 to superheated steam leaving the steam generating vessel at outlet 302. The secondary coolant loop water may be a Rankine cycle fluid used to drive a turbine-generator set for producing electric power in some embodiments.

The steam generating vessel 300 further includes a pressurizer 380 which maintains a predetermined pressure of the primary coolant fluid. The pressurizer is a pressure vessel mounted atop the steam generating vessel 300 and engineered to maintain a liquid/gas interface (i.e. primary coolant water/inert gas) that operates to enable control of the primary coolant pressure in the steam generator. In one embodiment, as shown, pressurizer 380 may be mounted directly on top of the steam generating vessel 300 and forms an integral unitary structural part of the vessel to hydraulically close the vessel at the top end. The assemblage of the foregoing three heat exchangers and the pressurizer may be referred to as a "stack."

Referring to FIG. 1, reactor vessel 200 and steam generating vessel 300 are housed in a steam generator containment vessel 110. Containment vessel 110 may be formed of a suitable shop-fabricated steel comprised of a top 111, bottom 112, and cylindrical sidewall 113 extending therebetween. In some embodiments, portions of the containment vessel which may be located above ground level may be made of ductile ribbed steel to help withstand aircraft impact. A missile shield 117 which is spaced above the top 111 of the containment vessel 110 may be provided as part of the containment vessel or a separate containment enclosure structure (not shown) which encloses the containment vessel 110. A horizontal partition wall 114 divides the containment vessel into an upper portion 114a and a lower portion 114b. Partition wall 114 defines a floor in the containment vessel. In one embodiment, a majority of reactor vessel 200 may be disposed in lower portion 114b and steam generating vessel 300 may be disposed in upper portion 114a as shown.

In various embodiments, the containment vessel 110 may be mounted above ground, partially below ground, or completely below ground. In certain embodiments, the containment vessel 110 may be positioned so that at least part or all of lower portion 114b that contains the nuclear fuel reactor core (e.g. fuel cartridge 230) is located below ground level. In one embodiment, the entire reactor vessel 200 and a portion of the steam generating vessel 300 are located entirely below ground level for maximum security. The cylindrical shell or sidewall 113 of containment vessel 110 may be horizontally split into an upper section and lower section which are joined together by a circumferential welded or bolted flanged joint 119 as shown in FIG. 1 to provide a demarcation for portions of the containment vessel which are located above and below ground level. In other embodiments, the upper and lower sections may be welded together without use of a flange.

In one embodiment, for example without limitation, the containment vessel 110 may have a representative height of approximately 200 feet or more for a 160 MW (megawatt) modular nuclear electric generation facility. A non-limiting representative diameter for this power generation facility is about 45 feet. Any suitable height and diameter for the containment vessel may be provided depending on system component configuration and dimensions.

Containment vessel 110 further includes a wet reactor well 115 defined in one embodiment by a cylindrical circumscribing walled enclosure 116 which is flooded with water to provide enhanced radiation shielding and a back-up reserve of readily accessible coolant for the reactor core. In one embodiment, the walled enclosure 116 may be formed of stainless steel cylindrical walls which extend circumferentially around the reactor vessel 200 as shown. Other suitable materials may be used to construct enclosure 116. The wet reactor well 115 is disposed in the lower portion 114b of the containment vessel 110. Lower portion 114b may further include a flooded (i.e. water) used fuel pool 118 adjacent to the enclosure 116. In one embodiment, as shown in FIG. 1, both the used fuel pool 118 and walled enclosure 116 are disposed below horizontal partition wall 114 as shown in FIG. 1.

In one embodiment, as shown in FIG. 1, the walled enclosure 116 may extend above partition wall 114 and the inlet/outlet nozzle connection between the reactor and steam generating vessels may be made by a penetration through the walled enclosure.

As further shown in FIG. 1, both the reactor vessel 200 and steam generating vessel 300 preferably may be vertically oriented as shown to reduce the footprint and diameter of the containment vessel 110. The containment vessel 110 has a diameter large enough to house both the reactor vessel, steam generating vessel, and any other appurtenances. The containment vessel 110 preferably has a height large enough to completely house the reactor vessel and steam generating vessel to provide a fully contained steam generator with exception of the water and steam inlet and outlet penetrations for second coolant loop fluid flow associated with the Rankine cycle for driving the turbine-generator set for producing electric power.

Figure 2:
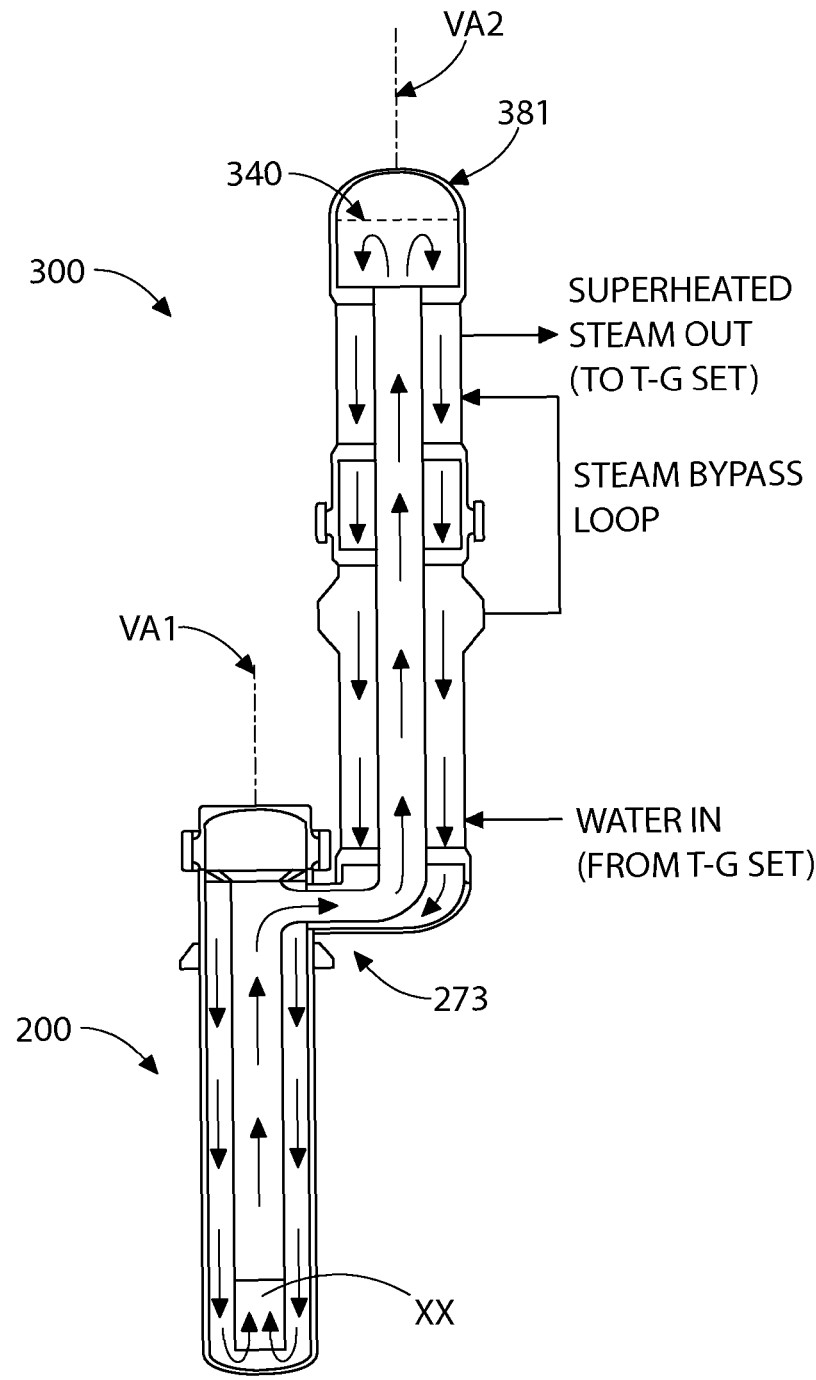
FIG. 2 is a schematic flow diagram of the nuclear steam supply system of FIG. 1 showing the flow path or circulation flow loop of primary coolant represented by the flow arrows.

FIG. 2 shows the flow or circulation of primary coolant (e.g. water) in the primary coolant loop. In one embodiment, the primary coolant flow is gravity-driven relying on the change in temperature and corresponding density of the coolant as it is heated in the reactor vessel 200, and then cooled in the steam generating vessel 300 as heat is transferred to the secondary coolant loop of the Rankine cycle which drives the turbine-generator (T-G) set. The pressure head created by the changing different densities of the coolant (i.e. hot—lower density and cold—higher density) induces flow or circulation through the reactor vessel-steam generating vessel system as shown by the directional flow arrows. Advantage, the gravity-driven primary coolant circulation requires no coolant pumps or machinery thereby resulting in cost (capital, operating, and maintenance) savings, reduced system power consumption thereby increasing energy conversion efficiency of the PWR system, in addition to other advantages as described herein.

Reactor vessel 200 may be similar to the reactor vessel with gravity-driven circulation system disclosed in commonly-owned U.S. patent application Ser. No. 13/577,163 filed Aug. 3, 2012, which is incorporated herein by reference in its entirety.

Figure 3:
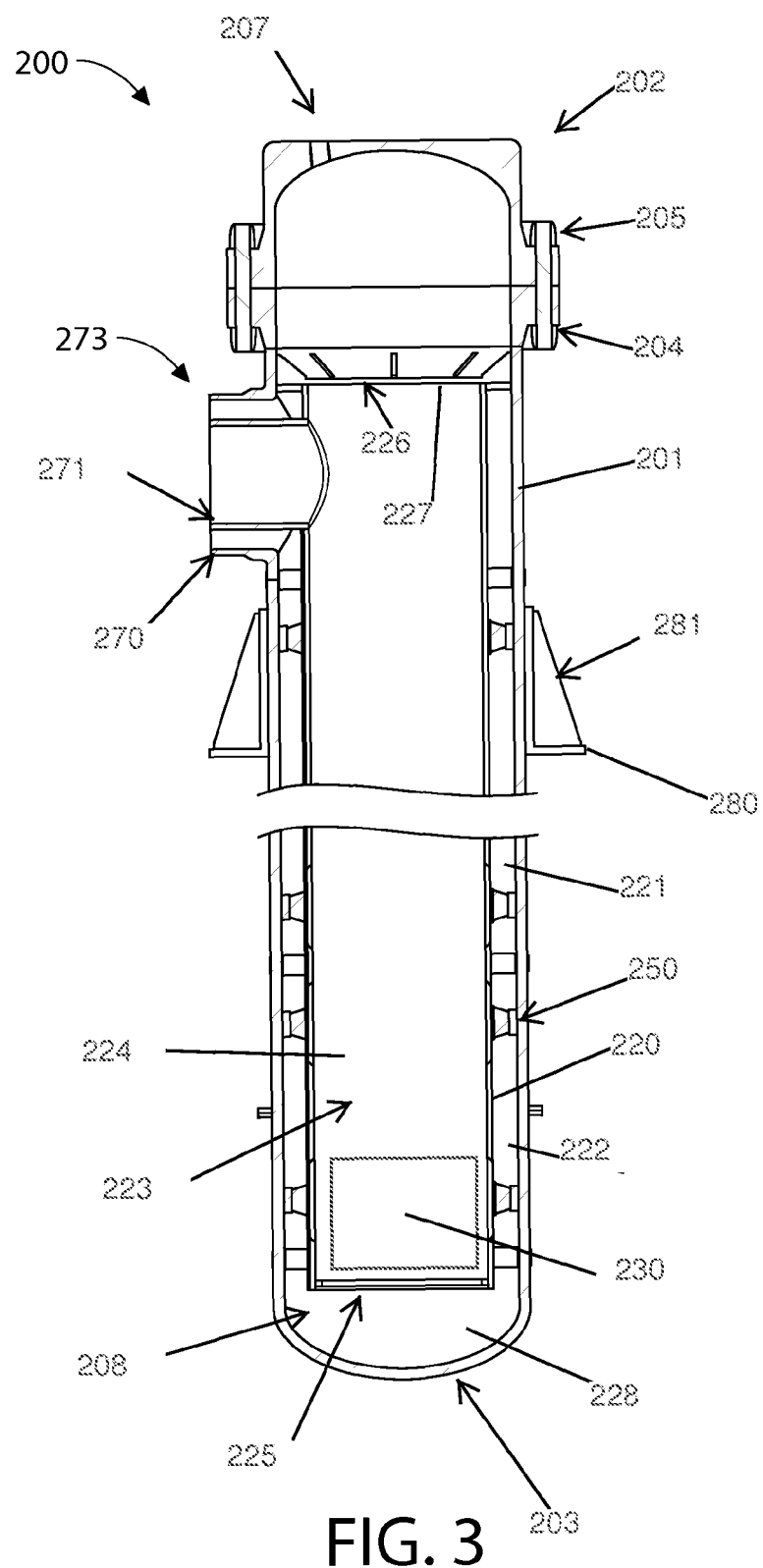
FIG. 3 is an elevation cross-sectional view of the reactor vessel of FIG. 1.

Referring to FIG. 3, reactor vessel 200 in one non-limiting embodiment is an ASME code Section III, Class 1 thick-walled cylindrical pressure vessel comprised of a cylindrical sidewall shell 201 with an integrally welded hemispherical bottom head 203 and a removable hemispherical top head 202. Shell 201 defines an internal cavity 208 configured for holding the reactor core, reactor shroud, and other appurtenances as described herein. In one embodiment, the upper extremity of the reactor vessel shell 201 may be equipped with a tapered hub flange 204 (also known as "welding neck" flange in the art) which is bolted to a similar flange 205 welded to the top head 202. The top head 202 in one embodiment is fastened to the "top flange" (which is also butt welded to the cylindrical reactor vessel shell) via a set of alloy bolts (not shown) pre-tensioned to establish a high integrity double gasket seal under all operation modes. The bolted connection of the top head 202 provides ready access to the reactor vessel internals such as the reactor core.

Two concentric self-energizing gaskets 206 compressed between the two mating flanges 204, 205 provide leak tightness of the reactor vessel 200 at the connection between the top head 202 and shell 201. The leak tightness under operating conditions is assured by an axisymmetric heating of the flanged joint that is provided by the fluid flow arrangement of the primary coolant in the system, as further described herein. The top head 202 contains the vertical penetrations 207 for insertion of the control rods and further may serve as a base for mounting the associated control rod drives, both of which are not depicted but well known in the art without further elaboration.

With continuing reference to FIG. 3, the reactor vessel 200 includes a cylindrical reactor shroud 220 which contains the reactor core defined by fuel cartridge 230. Reactor shroud 220 transversely divides the shell portion of the reactor vessel into two concentrically arranged spaces: (1) an outer annulus 221 defining an annular downcomer 222 for primary coolant entering the reactor vessel which is formed between the outer surface of the reactor shroud and the inner surface of the shell 201; and (2) a passageway 223 defining a riser column 224 for the primary coolant leaving the reactor vessel heated by fission in the reactor core. The reactor shroud 220 is elongated and extends in an axial direction along vertical axis VA1 of the reactor vessel which defines a height and includes an open bottom 225 and a closed top 226. In one embodiment, top 226 may be closed by a top flow isolation plate 227 which directs primary coolant flowing up the riser column 224 to the steam generating vessel 300, as further described herein. In one embodiment, the bottom 225 of reactor shroud 220 is vertically spaced apart by a distance the bottom head 203 of reactor vessel 200 and defines a bottom flow plenum 228. Bottom flow plenum 228 collects primary coolant from annular downcomer 222 and directs the coolant flow into the inlet of the riser column 224 formed by the open bottom 225 of reactor shroud 220 (see, e.g. FIG. 2).

Both the fuel cartridge 230 and reactor shroud 220 are supported by a core support structure ("CSS"), which in one embodiment includes a plurality of lateral support members 250 that span between and are attached to the reactor shroud and the shell 201 of the reactor vessel 200. A suitable number of supports members space both circumferentially and vertically apart are provided as needed to support the combined weight of the fuel cartridge 230 and reactor shroud 220. In one embodiment, the bottom of the reactor shroud 220 is not attached to the reactor vessel 200 to allow the shroud to grow thermally in a vertical axial direction (i.e. parallel to vertical axis VA1) without undue constraint.

The reactor shroud 220 is a double-walled cylinder in one embodiment which may be made of a corrosion resistant material, such as without limitation stainless steel. This double-wall construction of reactor shroud 220 forms an insulated structure designed to retard the flow of heat across it and forms a smooth vertical riser column 224 for upward flow of the primary coolant (i.e. water) heated by the fission in the fuel cartridge 230 ("core"), which is preferably located at the bottom extremity of the shroud in one embodiment as shown in FIGS. 1-3. The vertical space above the fuel cartridge 230 in the reactor shroud 220 may also contain interconnected control rod segments along with a set of "non-segmental baffles" that serve to protect them from flow induced vibration during reactor operations. The reactor shroud 220 is laterally supported by the reactor vessel by support members 250 to prevent damage from mechanical vibrations that may induce failure from metal fatigue.

Fuel cartridge 230 in one embodiment is a unitary autonomous structure containing upright fuel assemblies, and is situated in a region of the reactor vessel 200 that is spaced above bottom head 203 so that a relatively deep plenum of water lies underneath the fuel cartridge. The fuel cartridge 230 is insulated by reactor shroud 220 so that a majority of the heat generated by the fission reaction in the nuclear fuel core is used in heating the primary coolant flowing through the fuel cartridge and adjoining upper portions of the riser column 224. Fuel cartridge 230 is an open cylindrical structure including cylindrically shaped sidewalk 231, open top 233, and open bottom 234 to allow the primary coolant to flow upward completely through the cartridge (see directional flow arrows). In one embodiment, the sidewalls 231 may be formed by multiple arcuate segments of reflectors which are joined together by suitable means. The open interior of the fuel cartridge 230 is filled with a support grid 232 for holding the nuclear fuel rods and for insertion of control rods into the core to control the fission reaction as needed.

Briefly, in operation, the hot reactor primary coolant exits the reactor vessel 200 through a low flow resistance outlet nozzle 271 to be cooled in the adjacent steam generating vessel 300, as shown in FIGS. 2 and 3. The cooled reactor primary coolant leaves the steam generating vessel 300 and enters the reactor vessel 200 through the inlet nozzle 270. The internal plumbing and arrangement in the reactor vessel directs the cooled reactor coolant down through to the annular downcomer 222. The height of the reactor vessel 200 is preferably selected to support an adequate level of turbulence in the recirculating reactor primary coolant by virtue of the density differences in the hot and cold water columns which is commonly known as the thermo-siphon action (density difference driven flow) actuated by gravity. In one embodiment, the circulation of the reactor primary coolant is driven by over 8 psi pressure generated by the thermo-siphon action, which has been determined to ensure (with adequate margin) a thoroughly turbulent flow and stable hydraulic performance.

Referring to FIGS. 1 and 3, the top of the reactor vessel shell 201 is welded to a massive upper support forging which may be referred to as a reactor support flange 280. Support flange 280 supports the weight of the reactor vessel 200 and internal components above the wet reactor well 115. In one embodiment, the support flange is structurally stiffened and reinforced by a plurality of lugs 281 which are spaced circumferentially apart around the reactor vessel and welded to both the reactor vessel and flange, as shown. Support flange contacts and engages horizontal partition wall 114 which transfers the dead weight of the reactor vessel 200 to the containment vessel 110. The reactor vessel's radial and axial thermal expansion (i.e. a majority of growth being primarily downwards from horizontal partition wall 114) as the reactor heats up during operation is unconstrained. However, the portion of containment vessel 110 which projects above partition wall 114 is free to grow upwards in unison with the upwards growth of the steam generating vessel 30 to minimize axial differential expansion between the steam generating vessel and reactor vessel. Because the reactor vessel and steam generating vessel are configured and structured to thermally grow in height at substantially the same rate when heated, this arrangement helps minimize potential thermal expansions stress in the primary coolant fluid coupling 273 between the reactor vessel and steam generating vessel.

The support flange 280 is spaced vertically downwards on reactor vessel shell 201 by a distance from top head 202 of reactor vessel 200 sufficient to allow a fluid connection to be made to the steam generating vessel 300 which is above partition wall 114, as shown in FIGS. 1 and 2. When the reactor vessel 200 is mounted inside containment vessel 110, top head 202 of the reactor vessel and primary coolant fluid coupling 273 (collectively formed by combined inlet-outlet flow nozzle 270/271 and inlet-outlet flow nozzle 371/370 of steam generating vessel 300, shown in FIG. 4) are located above reactor well 115. This provides a location for connection to the steam generator headers and for the engineered safety systems (e.g. control rods, etc.) to deal with various postulated accident scenarios. A majority of the reactor vessel shell 201, however, may be disposed below partition wall 114 and immersed in the wet reactor well 115 as shown in FIG. 1.

The bottom region of the reactor vessel 200 is restrained by a lateral seismic restraint system 260 (shown schematically in FIG. 1) that spans the space between the reactor shell 201 and the reactor well 115 inside surface of the cylindrical enclosure 116 to withstand seismic events. The seismic restraint design is configured to allow for free axial (i.e. longitudinal along vertical axis VA1) and diametrical thermal expansion of the reactor vessel 200. The reactor well 115 is flooded during power operations to provide defense-in-depth against a (hypothetical, non-mechanistic) accident that is assumed to produce a rapid rise in the enthalpy of the reactor's contents. Because the reactor is designed to prevent loss of core water by leaks or breaks and the reactor well is flooded, burn-through of the reactor vessel by molten fuel (corium) is not likely.

Figure 4:
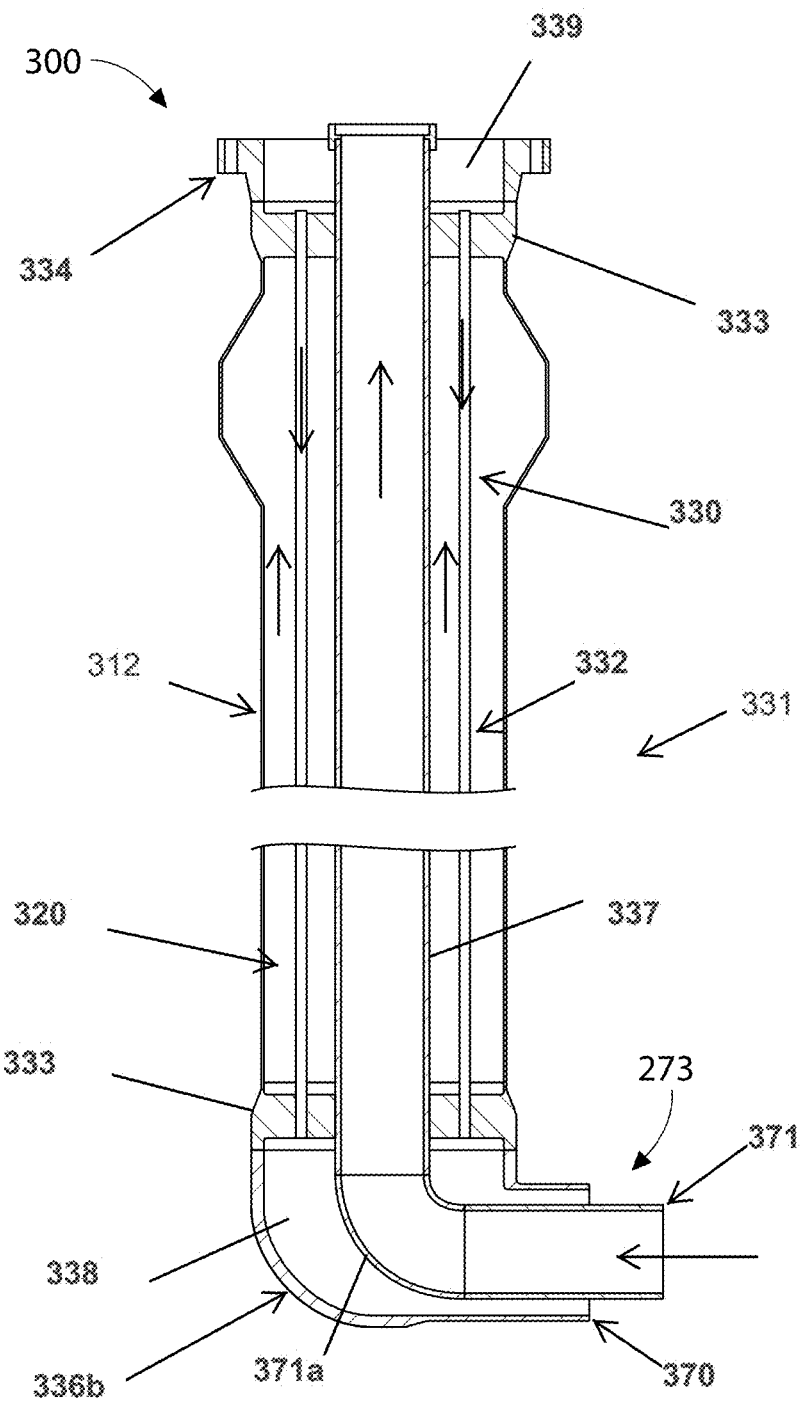
FIG. 4 is an elevation cross-sectional view of the bottom portion of the steam generating vessel reactor vessel of FIG. 1 showing the preheater section and steam generator section.

Referring to FIGS. 3 and 4, the combined inlet-outlet flow nozzle 270/271 is comprised of two concentric hollow forgings including an outer inlet nozzle 270 and inner outlet nozzle 271. The outlet nozzle 271 has one end welded to the reactor shroud 220 (internal to the reactor vessel shell 201)

and an opposite end welded to the inlet nozzle 371 of the steam generating vessel 300. The inlet nozzle 270 has one end welded to the reactor vessel shell 201 and an opposite end welded to outlet nozzle 370 of the steam generating vessel 300. The flow isolation plate 227 helps ensure that the hot primary coolant water exiting the reactor vessel cannot flow back into the annulus 221. In the present embodiment, the outlet nozzle 271 of the reactor vessel and inlet nozzle 371 of the steam generating vessel each have a smaller diameter than the inlet nozzle 270 of the reactor vessel and outlet nozzle 370 of the steam generating vessel. The combined inlet-outlet flow nozzle 270/271 is located above partition wall 114 of the containment vessel 110. The inlet nozzle 371 and outlet nozzle 370 of the steam generating vessel 300 collectively define a mating concentrically arranged combined inlet/outlet nozzle 371/370 for the steam generating vessel.

In order to avoid long loops of large piping in the reactor primary coolant system which creates the potential for a "large break" Loss of Coolant Accident (LOCA) event, both the combined inlet-outlet flow nozzle 270/271 of the reactor vessel 200 and combined inlet/outlet nozzle 371/370 for the steam generating vessel are intentionally very closely coupled to the shells of their respective vessels having a minimal radial projection beyond the shells. This permits the reactor vessel 200 to be directly coupled to the steam generating vessel 300 via the inlet/outlet nozzles as shown in FIGS. 1 and 2. As shown in FIG. 3, the combined inlet-outlet flow nozzle 270/271 of the reactor vessel preferably protrudes radially beyond shell 201 by a distance that is no more than the radial projection of the support flange 280. The total length of the inlet/outlet nozzle connection between the reactor vessel 200 and steam generating vessel 300 in certain embodiment is less than or equal to the diameter of the reactor vessel 200, and/or the steam generating vessel 300 to eliminate long runs of large coolant piping between the reactor and steam generating vessels. In one embodiment, the nozzle connections between the reactor vessel 200 and steam generating vessel 300 is straight without any elbows or bends.

The steam generating vessel 300 will now be described in additional detail. Referring to FIGS. 1-5, the steam generating vessel 300 in one embodiment may be an elongated, vertically oriented structure having a cylindrical shell 312 which defines a vertical axis VA2. In one embodiment, the vertical axis VA2 of the steam generating vessel is horizontally offset from the vertical axis VA2 of the reactor vessel 200 so that the steam generating vessel is arranged laterally adjacent to the reactor vessel. In one embodiment, the steam generating vessel 300 has a height which is at least as high as the height of the reactor vessel 200. The steam generating vessel contains, and supports from bottom up, the preheater 320, main steam generator 330, superheater 350, and pressurizer 380. In one embodiment, the preheater 320 is formed by a bottom portion of the steam generator section 330 and therefore does not include separate tubesheets. In certain arrangements and configurations of the steam generator assembly 100, the preheater 320 may be omitted depending on the thermo-hydraulic design of the system.

In one embodiment, the steam generating vessel 200 includes a gusseted support flange 400 which may be similar to reactor vessel support 280 described herein. The steam generating vessel may be welded to shell 312 and supported as shown in FIG. 1 from partition wall 114.

The preheater 320, steam generator 330, and superheater 350 are tubular heat exchangers each having a plurality of parallel straight tubes 332 (i.e. tube bundle) with tubesheets 333 disposed at the extremities or ends of each tube bundle that support the tubes. In one embodiment, the preheater 320, steam generator 330, and superheater 350 are positioned to form a parallel counter-flow type heat exchanger arrangement in which the secondary coolant (Rankine cycle) flows in an opposite, but parallel direction to the reactor primary coolant (see, e.g. FIGS. 4 and 5). The trio of the foregoing tubular heat exchangers (i.e. preheater, steam generator, and superheater) are hydraulically connected in series on both the tube side (reactor primary coolant) and the shellside (the secondary coolant forming the working fluid of the Rankine Cycle which changes phase from liquid to superheated gas).

Steam generating vessel 300 includes a top 310, bottom 311, an axially extending cylindrical shell 312, and an internal riser pipe 337 which is concentrically aligned with shell 312 and lies on centerline CL2 of the vessel. The tubes 332 are circumferentially arranged around the outside of the riser pipe 337 between the riser pipe and shell 312 in sections of steam generating vessel 300 which include preheater 320, steam generator 330, and superheater 350. In one embodiment, the riser pipe 337 extends completely through all of the tubesheets 333 associated with the preheater 320, steam generator 330, and superheater 350 from the top of the steam generating vessel 300 to the bottom to form a continuous reactor primary coolant flowpath between the reactor vessel 200 and the pressurizer 380.

In one embodiment, the steam generating vessel includes an upper superheater section 351 and a lower steam generator section 331 which is detachably mounted to the superheater section such as by a bolted flanged joint 352. This allows the steam generator section 331 (which may include steam generator 330 and preheater 320) and superheater section 351 (which may include the superheater 350 and pressurizer 380) to separately fabricated and shipped to the power plant site for assembly there.

Figure 5:
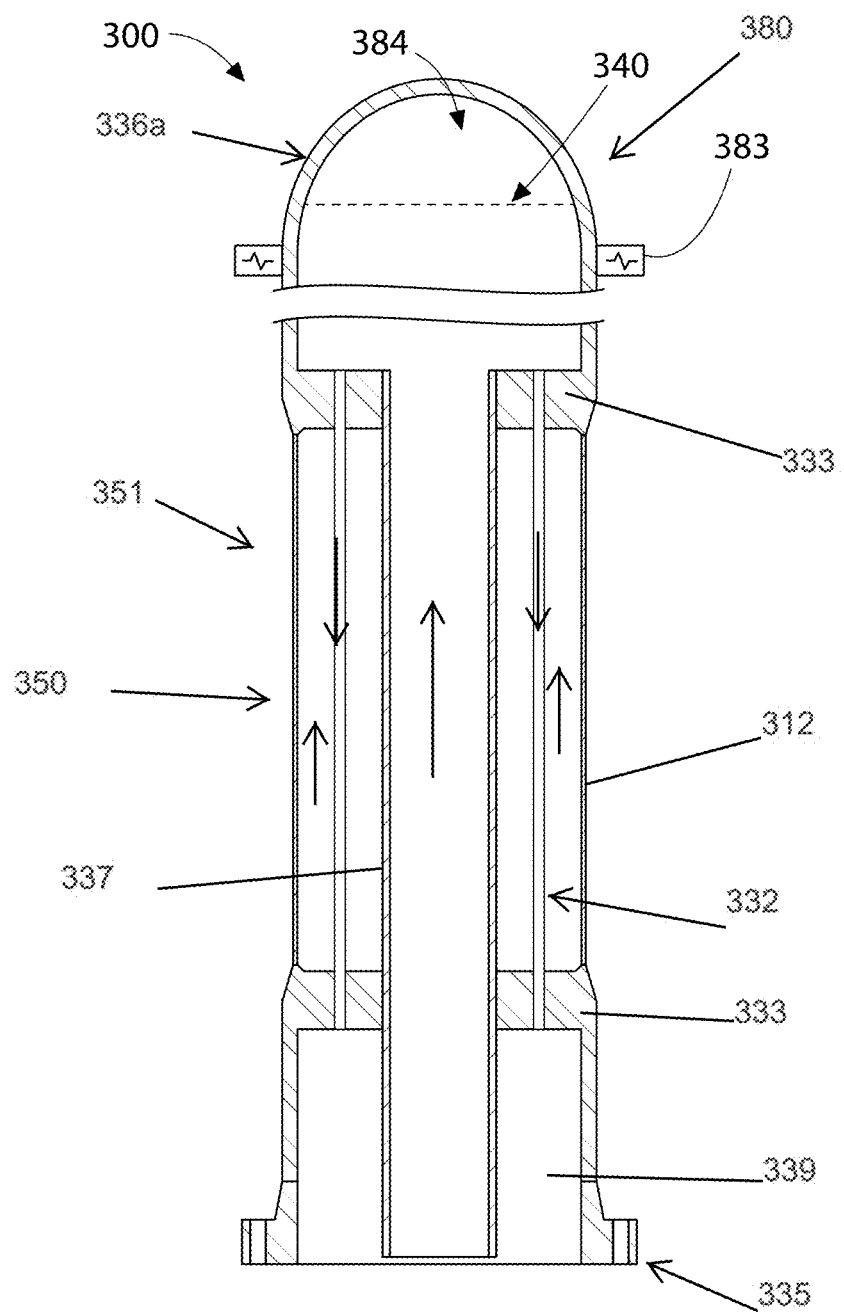
FIG. 5 is an elevation cross-sectional view of the top portion of the steam generating vessel of FIG. 1 showing the superheater section and pressurizer mounted atop the steam generating vessel.
Figure 6:
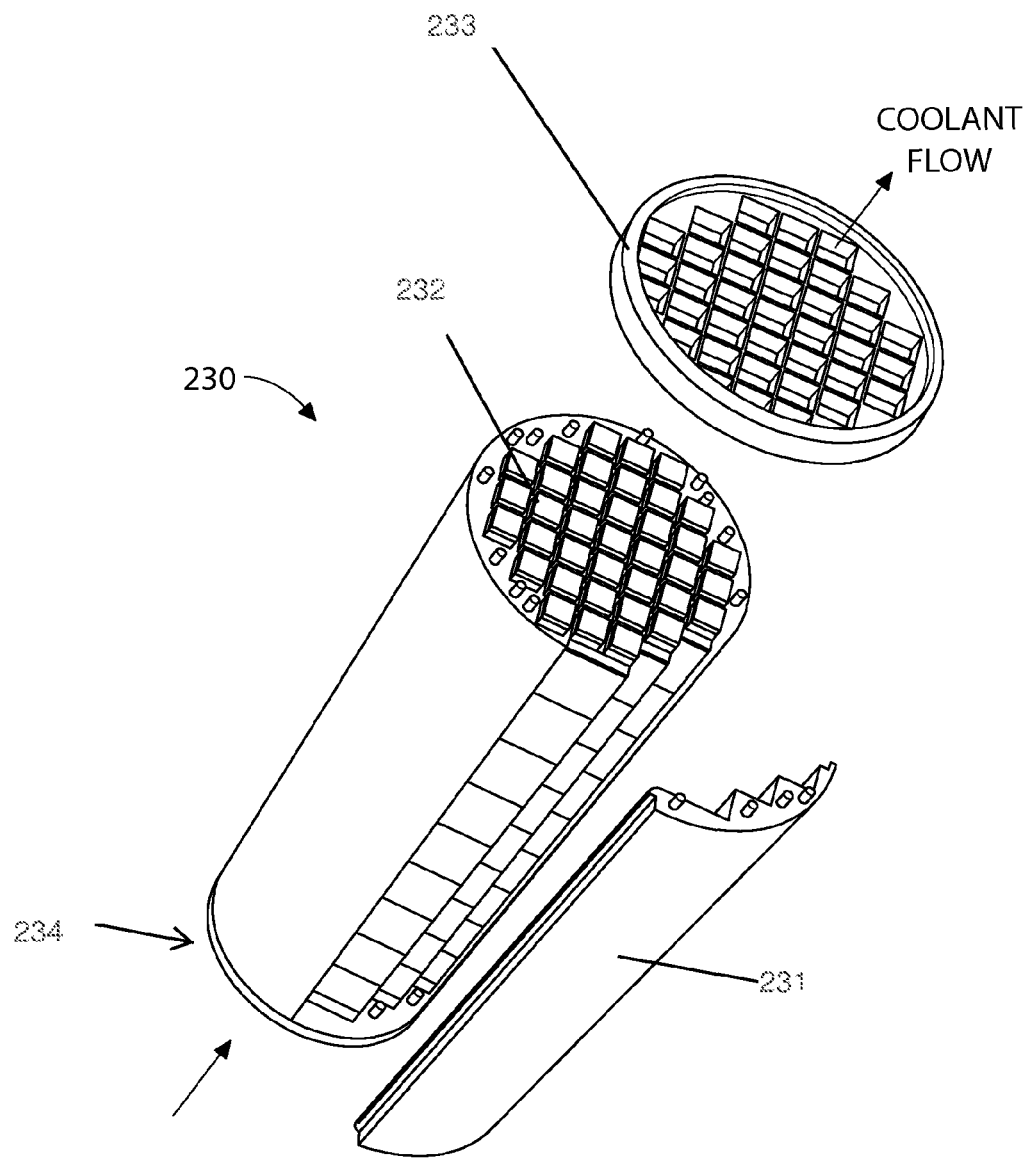
FIG. 6 is an exploded perspective view of the fuel cartridge positioned in the reactor vessel of FIG. 1.
Figure 7:
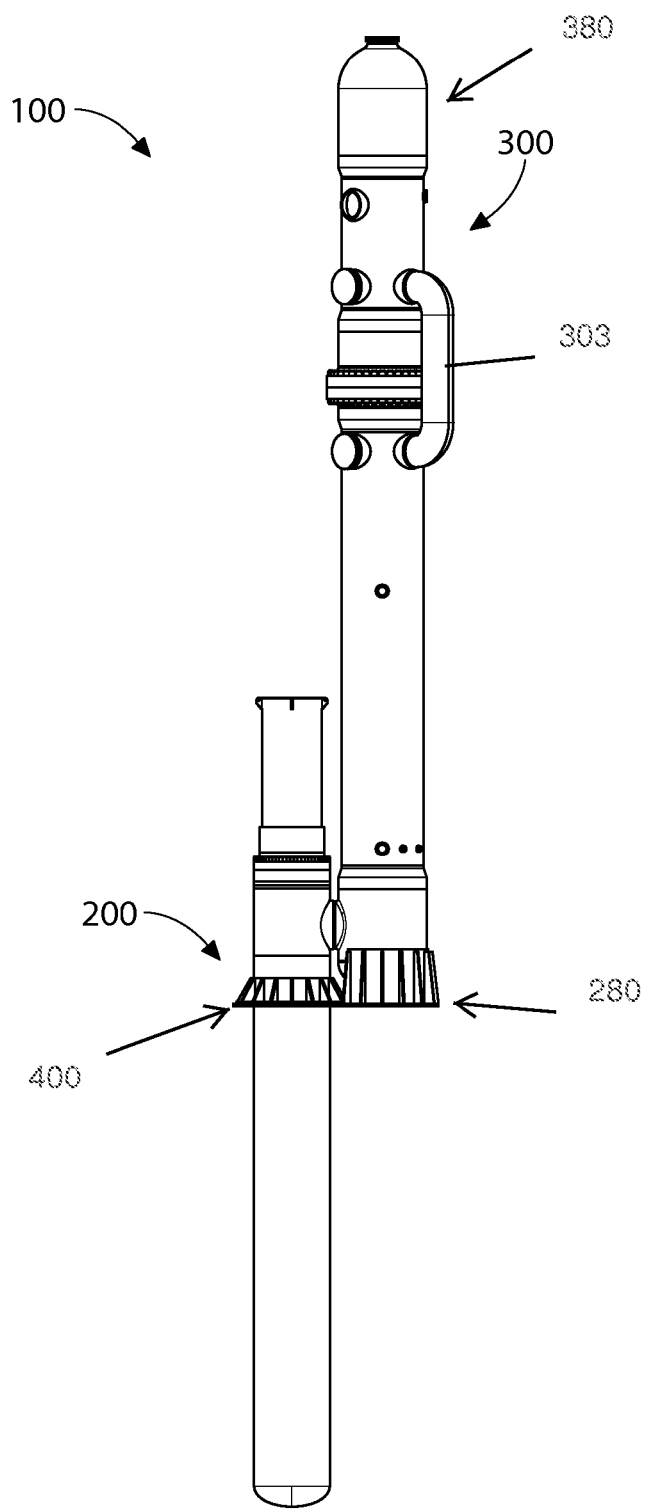
FIG. 7 is a front elevation view of the steam generator assembly of FIG. 1.
Figure 8:
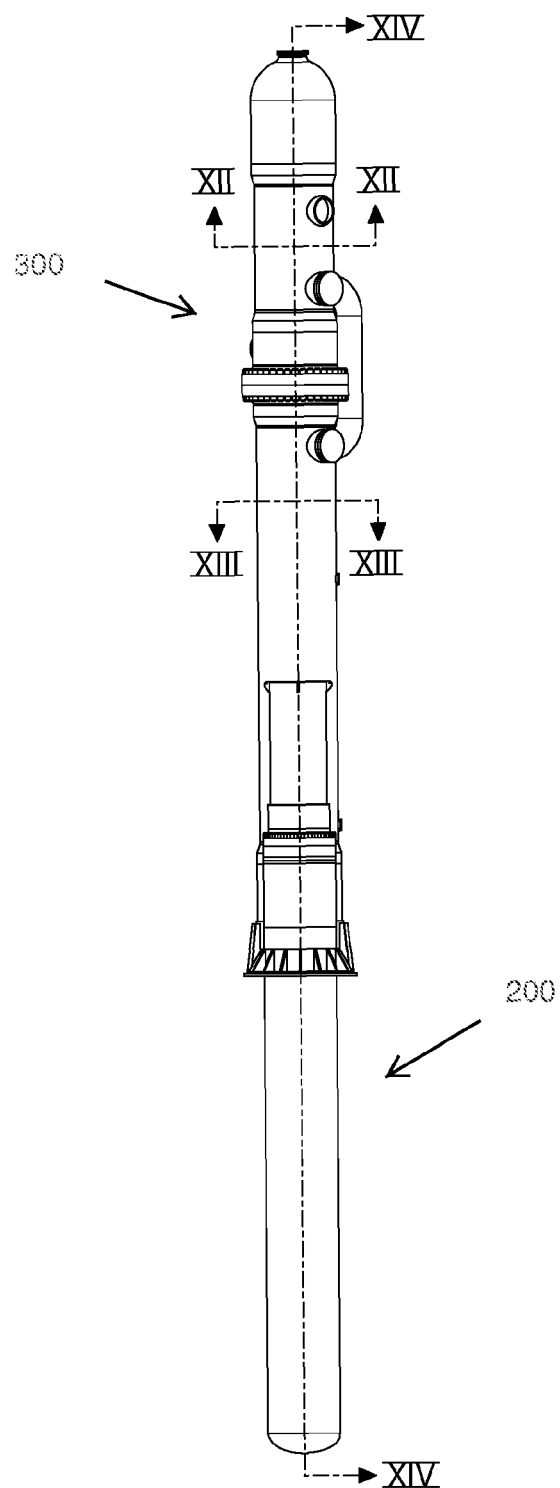
FIG. 8 is a side elevation view of the steam generator assembly of FIG. 1.
Figure 9:
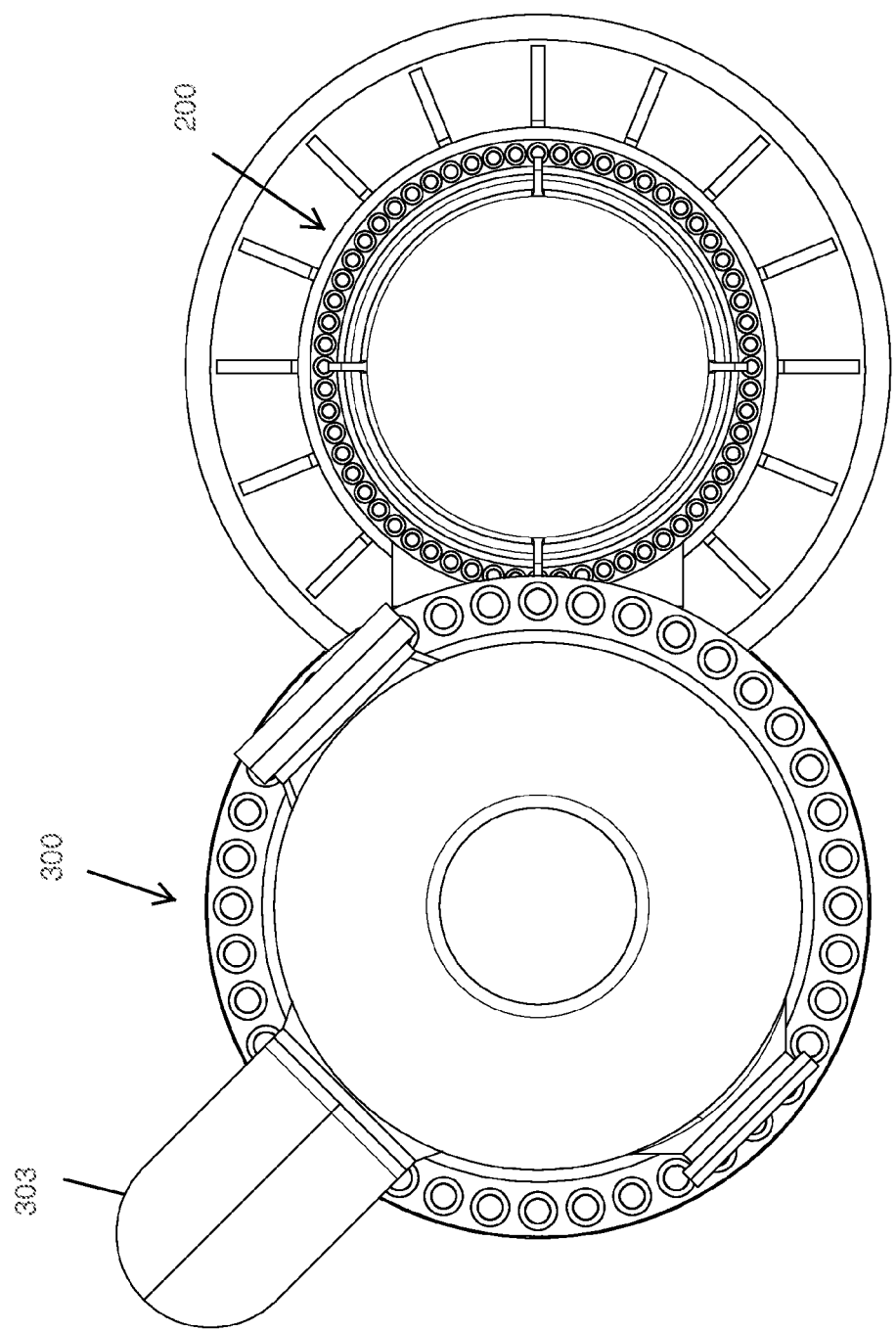
FIG. 9 is a top view of the steam generator assembly of FIG. 1.
Figure 10:
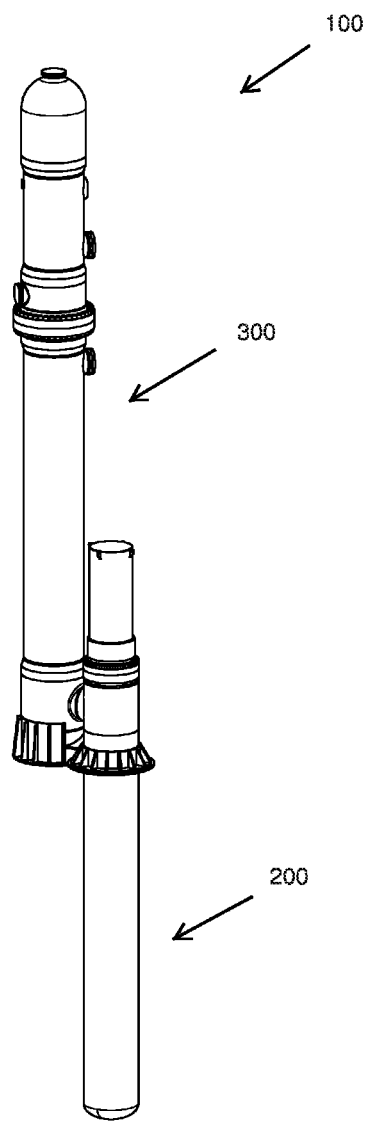
FIG. 10 is a top perspective view of the steam generator assembly of FIG. 1.
Figure 11:
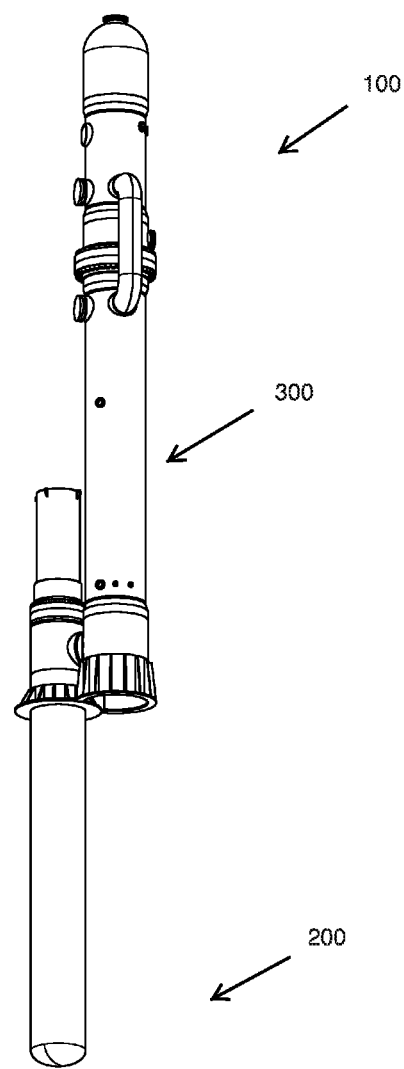
FIG. 11 is a bottom perspective view of the steam generator assembly of FIG. 1.
Figure 12:
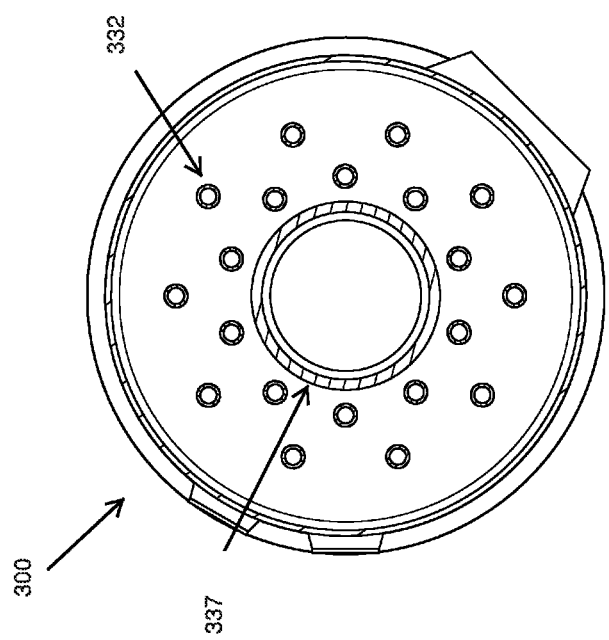
FIG. 12 is a transverse cross-sectional view of the steam generating vessel taken along line XII-XII in FIG. 8.
Figure 13:
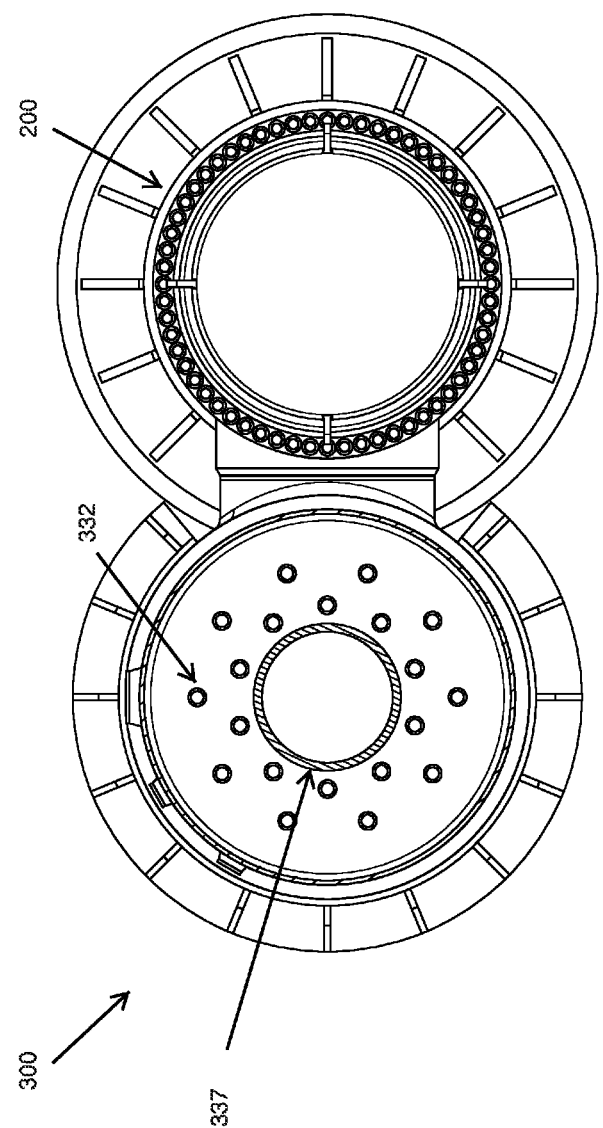
FIG. 13 is a transverse cross-sectional view of the steam generating vessel taken along line XIII-XIII in FIG. 8.
Figure 14:
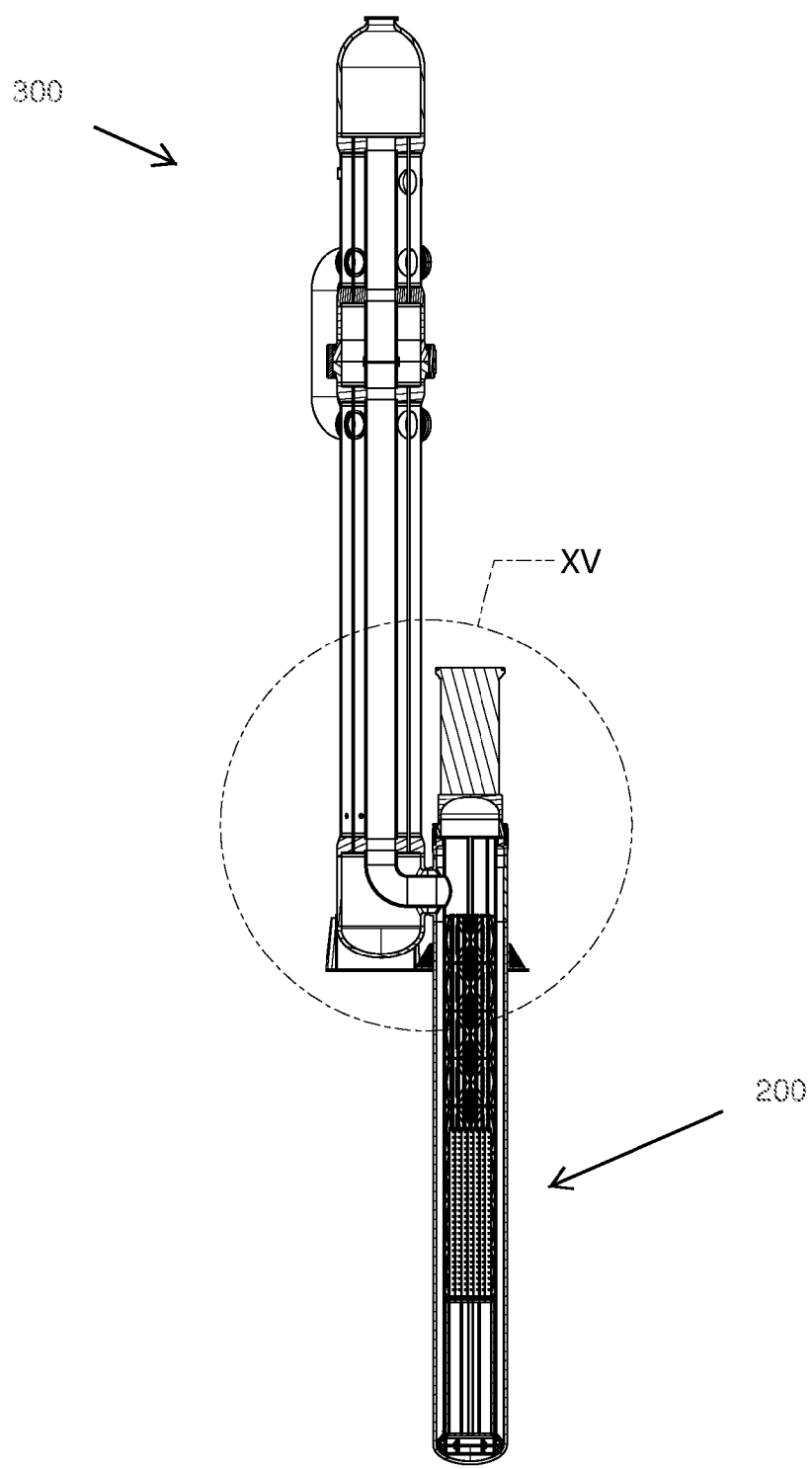
FIG. 14 is a longitudinal cross-sectional view of the steam generating vessel taken along line XIV-XIV in FIG. 8.
Figure 15:
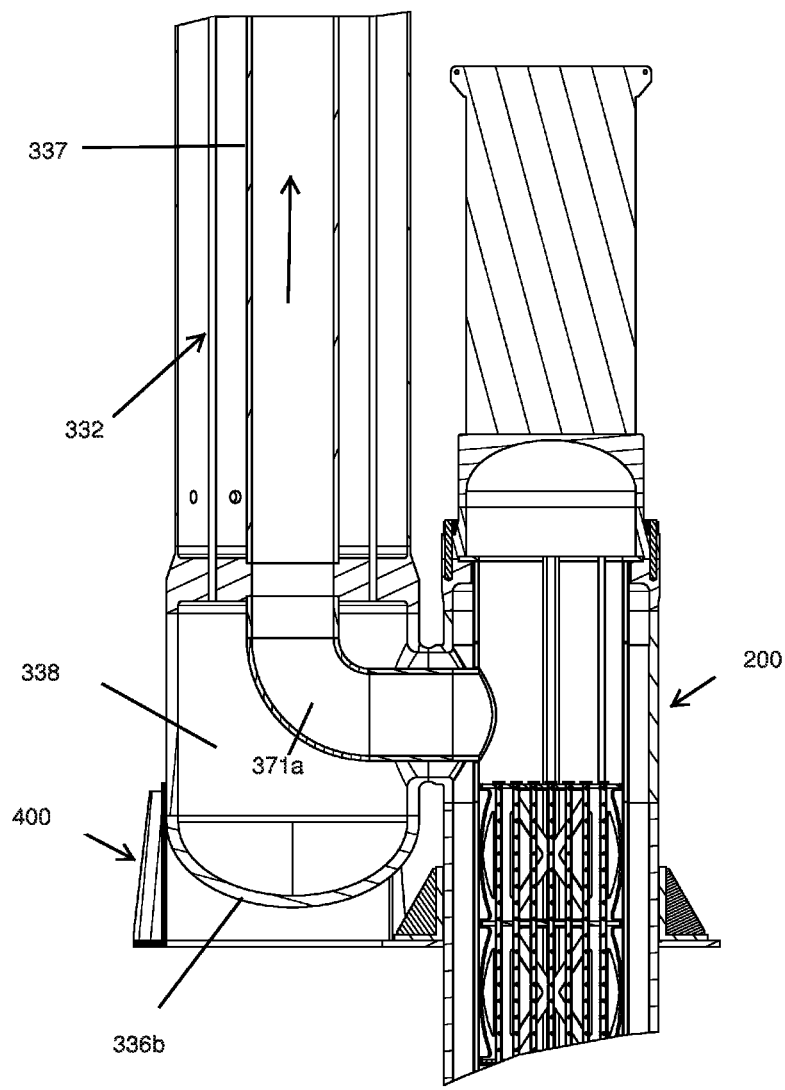
FIG. 15 is a close-up detailed view of portion XV shown in FIG. 14.

Lower steam generator section 331 terminates at the top with an upper flanged channel 334 which is bolted to a lower flanged channel 335 of the upper superheater section 351 to collectively form flanged joint 352 and an intermediate plenum 339 (see FIGS. 4 and 5). The bottom of steam generator section 331 terminates with a bottom head 336b as best shown in FIG. 4). Bottom head 336b defines an annular space between riser pipe 337 and shell 312 which forms a bottom plenum 338 which collects and channels primary coolant from steam generating vessel 300 back to reactor vessel 200. Bottom head 336b forms inlet-outlet flow nozzle 371/370 which is disposed perpendicular to shell 312 and riser pipe 337. Inlet nozzle 371 may be fluidly coupled to the riser pipe 337 by an elbow 371a to change direction of the primary coolant from horizontal to vertical.

Upper superheater section 351 terminates at the bottom with lower flanged channel 335, as noted above. The superheater section 351 is topped by pressurizer 380 as shown in FIGS. 2 and 5, which is in fluid communication with both the top or outlet of riser pipe 337 and the inlet to superheater tubes 332. In one embodiment, the pressurizer 380 is mounted directly to the shell 312 of steam generating vessel 300 and forms a top head 336a on the shell. In one embodiment, the pressurizer has a domed or hemispherical head and may be welded to shell 312, or alternatively bolted in other possible embodiments. The pressurizer 380 forms an upper plenum which collects reactor primary coolant rising through riser pipe 337 and distributes the primary coolant to the superheater tubes 332. The pressurizer 380 includes a heating/quenching element 381 (i.e. water/steam) for pressure control of the reactor primary coolant. Shown schematically in FIGS. 2 and 5, element 381 is comprised of a bank of electric heaters 383 which are installed in the pressurizer section that serve to increase the pressure by boiling some of the primary coolant and creating a steam bubble that resides at the top of the pressurizer near the head (above the liquid/gas interface 340 represented by the dashed line). A water spray column 384 is located near the top head 336a of the pressurizer which sprays water into the steam bubble thereby condensing the steam and reducing the size of the steam bubble. The increase/decrease in size of the steam bubble serves to increase/decrease the pressure of the primary coolant inside the reactor coolant system. In one exemplary embodiment, a representative primary coolant pressure maintained by the pressurizer 380 and heating/quenching element 381 may be without limitation about 2,250 psi.

In alternative embodiments, as noted above, liquid/gas interface 340 is formed between an inert gas, such as nitrogen (N2) supplied by supply tanks (not shown connected to the pressurizer 380, and the liquid primary coolant.

The pressurizer 380 may be connected to the top of superheater section 351 above the uppermost or inlet tubesheet 333 shown in FIG. 5 by any suitable means, including a welded connection as shown or alternatively bolted connection in some embodiments. In one embodiment, as shown in FIGS. 2 and 5, the pressurizer 380 may have a domed or hemispherical shaped top or head.

In one embodiment, the external surfaces of the superheater tubes 332 may include integral fins to compensate for the reduced heat transfer rates in the gaseous superheated steam media. The superheater tube bundle is protected from erosion (i.e. by tiny water droplets that may remain entrained in the up-flowing steam) by ensuring that the steam flow is counter-flow being parallel along, rather than across, the tubes in the tube bundle.

Referring to FIGS. 2 and 4-5, at least one generally U-shaped steam bypass piping loop 303 is provided to route the upflowing steam around the intermediate plenum 339 and by-pass the upper and lower flanged channels 334, 335. Preferably, the steam piping loop 303 is located proximate to the shell of the steam generating vessel 300 and made as short as possible.

In one non-limiting embodiment, the steam generating vessel 300 may be made of a corrosion resistant metal such as stainless steel.

The flow path of the reactor primary coolant and secondary coolant for the Rankine cycle will now be described. FIGS. 2 and 3 show the reactor primary coolant flowpath of the steam generator assembly 100. FIGS. 4-5 show primarily the secondary coolant flowpath of the Rankine cycle through steam generating vessel 300. Cooled primary coolant ("cold") leaves steam generating vessel 300 through outlet nozzle 370 and enters reactor vessel 200 through outer inlet nozzle 270. The primary coolant flows downwards through annular downcomer 222 enters the bottom of riser column 224. The primary coolant flows upwards through fuel cartridge 230 and is heated by convention and conduction in the fuel core. The now heated or "hot" primary coolant exits the reactor vessel 200 through inner outlet nozzle 271 and enters steam generating vessel 300 through inlet nozzle 371. The hot primary coolant flows vertically upwards in riser pipe 337 and is directed to the top of the "stack" into pressurizer 380. The hot primary coolant reverses direction and begins the downwards journey through steam generating vessel 200. The hot primary coolant first flows down through the superheater 350 on the tube side of the tube bundle which has saturated steam (secondary coolant) flowing upwards on the shell side from the steam generator 230 below in the stack. The saturated steam becomes superheated and leaves the steam generating vessel 300. The now less hot coolant continues to flow down through the steam generating vessel 300 next proceeding through the steam generator 330 on the tube side. On the shell side, liquid secondary coolant undergoes a phase change and is turned to steam as the primary coolant is further cooled in giving up heat to the secondary coolant. The now further cooled primary coolant flows down through the preheater 320 on the tube side which encounters and preheats the secondary coolant on the shell side of the tube bundle upstream of the steam generator. The now cooled primary coolant has completed the closed flow loop through the steam generating vessel 300 and reactor vessel 200, and re-enters the reactor vessel through inlet nozzle 270.

In one embodiment, an exemplary non-limiting reactor vessel "hot" outlet temperature may be in a range of about and including 575 to 600 degrees F. An exemplary non-limiting reactor vessel "cold" inlet temperature may be in a range of about and including 350 to 385 degrees F. An exemplary reactor vessel operating pressure may be about 2,250 psi (pounds per square inch) which is maintained by pressurizer 380. Other suitable flow temperatures and pressures may be used depending on the heat transfer requirements of the specific application and Rankine cycle side steam production operating parameters. In one embodiment, the reactor vessel primary coolant may be unborated demineralized water.

In one exemplary embodiment, the shell 312 of steam generating vessel may be made of steel such as type 508 carbon steel. Tube sheets 333 may be made of the same steel with an Inconel cladding when the tubes 312 are made of Inconel.

While the invention has been described and illustrated in sufficient detail that those skilled in this art can readily make and use it, various alternatives, modifications, and improvements should become readily apparent without departing from the spirit and scope of the invention.

What is claimed is:
1. A nuclear steam supply system with natural gravity-driven coolant circulation, the system comprising:
 a vertically elongated reactor vessel comprising a shell forming an internal cavity;
 a reactor core comprising nuclear fuel disposed within the internal cavity;
 a steam generating vessel comprising a shell and a plurality of heat exchanger sections disposed in a vertically stacked relationship, the steam generating vessel shell being formed separately from the reactor vessel shell and fluidly connected together via a fluid coupling;
 a closed-loop primary coolant system formed between the reactor vessel and the steam generating vessel, the primary coolant system having a primary coolant flowing through the reactor pressure vessel to cool the reactor core and through the steam generating vessel to transfer heat to a secondary coolant flowing through the steam generating vessel,
 wherein the primary coolant system is configured to induce gravity driven circulation of the primary coolant through the reactor vessel and steam generating vessel;
 wherein the secondary coolant flows vertically through each of the heat exchanger sections of the steam generating vessel and changes phase from liquid to steam;

wherein the fluid coupling comprises the reactor vessel further including an inner first primary coolant outlet nozzle and an outer first primary coolant inlet nozzle concentrically aligned with the first primary coolant outlet nozzle, and the steam generating vessel further including an outer second primary coolant outlet nozzle and an inner second primary coolant inlet nozzle concentrically aligned with the second primary coolant outlet nozzle; and wherein the first primary coolant outlet nozzle is fluidly connected directly to the second primary coolant inlet nozzle, and the second primary coolant outlet nozzle is fluidly connected directly to the first primary coolant inlet nozzle, the primary coolant exiting the reactor vessel through the first primary coolant outlet nozzle and entering the steam generating vessel through the second primary coolant inlet nozzle, and the primary coolant exiting the steam generating vessel through the second primary coolant outlet nozzle and entering the reactor vessel through the first primary coolant inlet nozzle;

wherein a total length of the fluid coupling between the reactor vessel and steam generating vessel is less than or equal to a diameter of the reactor vessel.

2. A nuclear steam supply system with natural gravity-driven coolant circulation, the system comprising:

a vertically elongated reactor vessel comprising a shell forming an internal cavity;

a reactor core comprising nuclear fuel disposed within the internal cavity;

a steam generating vessel comprising a shell and a plurality of heat exchanger sections disposed in a vertically stacked relationship, the steam generating vessel shell being formed separately from the reactor vessel shell and fluidly connected together via a fluid coupling;

a closed-loop primary coolant system formed between the reactor vessel and the steam generating vessel, the primary coolant system having a primary coolant flowing through the reactor pressure vessel to cool the reactor core and through the steam generating vessel to transfer heat to a secondary coolant flowing through the steam generating vessel, wherein the primary coolant system is configured to induce gravity driven circulation of the primary coolant through the reactor vessel and steam generating vessel;

wherein the secondary coolant flows vertically through each of the heat exchanger sections of the steam generating vessel and changes phase from liquid to steam;

wherein primary coolant flows in the primary coolant system from the reactor vessel to the steam generating vessel without assistance from a pump;

wherein operation of the reactor core heats the primary coolant to a degree sufficient to cause natural circulation of the primary coolant through the closed-loop primary coolant system between the reactor vessel and the steam generating vessel;

wherein the reactor vessel and the steam generating vessel are independently supported;

wherein the heat exchanger sections of the steam generating vessel includes a lower steam generating section and an upper superheater section disposed above the lower steam generating section, the superheater section being operable to heat secondary coolant to superheated steam conditions;

wherein the steam generating vessel further includes a preheater section disposed below the lower steam generating section;

wherein the preheater section is formed by a lower portion of the lower steam generating section;

wherein the secondary coolant flows upwards through the steam generating vessel and the primary coolant flows downwards through the steam generating vessel;

wherein the secondary coolant enters a bottom portion of the steam generating vessel as a saturated liquid and leaves an upper portion of the steam generating vessel as superheated steam;

wherein the steam generating vessel includes a central vertically-extending riser pipe which is fluidly coupled to the reactor vessel, the primary coolant flowing from the reactor vessel upwards through the riser pipe;

wherein the secondary coolant flows vertically upwards the steam generating vessel between the shell of the steam generating vessel and the riser pipe;

wherein the primary coolant further flows vertically downwards through the stacked heat exchanger sections in the steam generating vessel;

a centrally-located vertical riser disposed in the internal cavity of the reactor vessel, the vertical riser being fluidly connected to a vertical riser pipe of the steam generating vessel via a laterally extending inlet/outlet coupling between the vessels;

wherein the heat exchanger sections each include a pair of vertically spaced apart tubesheets and a tube bundle comprising a plurality of vertically-oriented tubes extending between the tubesheets;

wherein the primary coolant flows downwards through the tubes of each heat exchanger section on a tube side;

wherein the secondary coolant flows upwards between the tubes on a shell side of each heat exchanger section in a parallel cross flow type arrangement;

wherein the tubes in each heat exchanger section are arranged in a circumferentially spaced pattern around the riser pipe between the shell of the steam generating vessel and riser pipe;

a pressurizer mounted on a top end of the steam generating vessel, the pressurizer including a head which closes the top end;

wherein the pressurizer forms a liquid/gas interface of the primary coolant at the top end of the steam generating vessel;

wherein the steam generating vessel includes a intermediate flow plenum disposed between a top tubesheet of the lower steam generating section and a bottom tubesheet of the upper superheater section, the primary coolant flowing through intermediate plenum from the upper superheater section to the lower steam generating section;

an external secondary coolant bypass piping loop fluidly connecting the shell side of the upper superheater section and the shell side of the lower steam generating section, the bypass piping loop arranged to bridge over the intermediate flow plenum;

a bottom flow plenum disposed at a bottom end of the steam generating vessel below the stacked heat exchanger sections, the bottom flow plenum being operable to collect primary coolant flowing downwards through the steam generating vessel for return to the reactor vessel;

wherein the reactor vessel further includes a first outlet nozzle and a first inlet nozzle concentrically aligned with the first outlet nozzle, and wherein the steam generating vessel further includes a second outlet nozzle and a second inlet nozzle concentrically aligned with the second outlet nozzle;

wherein the first outlet nozzle is fluidly connected to the second inlet nozzle, and the second outlet nozzle is fluidly connected to the first inlet nozzle;

wherein the first and second inlet nozzles and first and second outlet nozzles collectively define a closely coupled primary coolant fluid coupling having a lateral length that is less than a diameter of the steam generating vessel.

3. A nuclear steam supply system with natural gravity-driven coolant circulation, the system comprising:

a vertically elongated reactor vessel having a first vertical axis and comprising a shell forming an internal cavity;

a vertical riser and a downcomer disposed in the cavity of the reactor vessel for conducting a flowing fluid, the downcomer being in fluid communication with the vertical riser;

a reactor core comprising nuclear fuel disposed within the internal cavity of the reactor vessel;

a vertically elongated steam generating vessel having a second vertical axis and a cylindrical shell, the steam generating vessel including a plurality of heat exchanger sections fluidly connected in a vertically stacked relationship, the steam generating vessel shell being formed separately from the reactor vessel shell and fluidly connected together via a fluid coupling;

a reactor primary coolant system having a gravity-driven closed flow loop with a primary coolant flowing through the downcomer and vertical riser of the reactor vessel for heating by the reactor core, the primary coolant further flowing through the heat exchanger sections of the steam generating vessel to transfer heat to a secondary coolant flowing through the steam generating vessel;

the heat exchanger sections of the steam generating vessel including a lower steam generating section and an upper superheater section disposed above the lower steam generating section, the superheater section being operable to heat secondary coolant to superheated steam conditions;

the steam generating vessel further including a tubeless intermediate flow plenum disposed between a top tubesheet of the lower steam generating section and a bottom tubesheet of the upper superheater section, the primary coolant flowing through the intermediate plenum from the upper superheater section to the lower steam generating section;

an external secondary coolant bypass piping loop fluidly connecting a shell side of the upper superheater section and a shell side of the lower steam generating section, the bypass piping loop arranged to bridge over the intermediate flow plenum;

wherein the secondary coolant flows vertically through the heat exchanger sections of the steam generating vessel and changes phase from liquid to steam;

wherein the first vertical axis of the reactor vessel is laterally offset from the second vertical axis of the steam generating vessel.

4. The system of claim 3, wherein the downcomer is formed by an annular space between the shell of the reactor vessel and the vertical riser which is axially aligned with the first vertical axis concentrically aligned with the vertical riser.

5. The system of claim 3, further comprising a central riser pipe in steam generating vessel and tube bundles of the heat exchanger sections being arranged radially around the riser pipe.

6. The system of claim 3, wherein primary coolant flows in the primary coolant system from the reactor vessel to the steam generating vessel without assistance from a pump.

7. The system of claim 3, wherein operation of the reactor core heats the primary coolant to a degree sufficient to cause natural circulation of the primary coolant through the closed-loop primary coolant system between the reactor vessel and the steam generating vessel.

8. The system of claim 3, wherein the reactor vessel and the steam generating vessel are independently supported.

9. The system of claim 3, wherein the steam generating vessel further includes a preheater section disposed below the lower steam generating section; and wherein the preheater section is formed by a lower portion of the lower steam generating section.

10. The system of claim 3, wherein the secondary coolant flows upwards through the steam generating vessel and the primary coolant flows downwards through the steam generating vessel; and wherein the secondary coolant enters a bottom portion of the steam generating vessel as a saturated liquid and leaves an upper portion of the steam generating vessel as superheated steam.

11. The system of claim 3, wherein the steam generating vessel includes a central vertically-extending riser pipe which is fluidly coupled to the reactor vessel, the primary coolant flowing from the reactor vessel upwards through the riser pipe; wherein the secondary coolant flows vertically upwards the steam generating vessel between the shell of the steam generating vessel and the riser pipe; and wherein the primary coolant further flows vertically downwards through the stacked heat exchanger sections in the steam generating vessel.

12. The system of claim 3, wherein:

the stacked heat exchanger sections each include a tube bundle comprising a plurality of vertically-oriented tubes extending between the tubesheets;

the primary coolant flows downwards through the tubes of each heat exchanger section on a tube side;

the secondary coolant flows upwards between the tubes on a shell side of each heat exchanger section in a parallel cross flow type arrangement;

wherein the steam generating vessel includes a central vertically-extending riser pipe which is fluidly coupled to the reactor vessel, the primary coolant flowing from the reactor vessel upwards through the riser pipe; and wherein the tubes in each heat exchanger section are arranged in a circumferentially spaced pattern around the riser pipe between the shell of the steam generating vessel and riser pipe.

13. The system of claim 3, further comprising a pressurizer mounted on a top end of the steam generating vessel, the pressurizer including a head which closes the top end; and wherein the pressurizer forms a liquid/gas interface of the primary coolant at the top end of the steam generating vessel.

14. The system of claim 3, wherein the reactor vessel further includes a first outlet nozzle and a first inlet nozzle concentrically aligned with the first outlet nozzle, and wherein the steam generating vessel further includes a second outlet nozzle and a second inlet nozzle concentrically aligned with the second outlet nozzle, wherein the first outlet nozzle is fluidly connected directly to the second inlet nozzle, and the second outlet nozzle is fluidly connected directly to the first inlet nozzle; and wherein the first and second inlet nozzles and first and second outlet nozzles collectively define a closely coupled primary coolant fluid coupling having a lateral length that is less than a diameter of the steam generating vessel.

\* \* \* \* \*